Aug. 30, 1932.                L. O. BEARD                1,874,856
                              ABRADING TOOL
                          Filed March 29, 1930
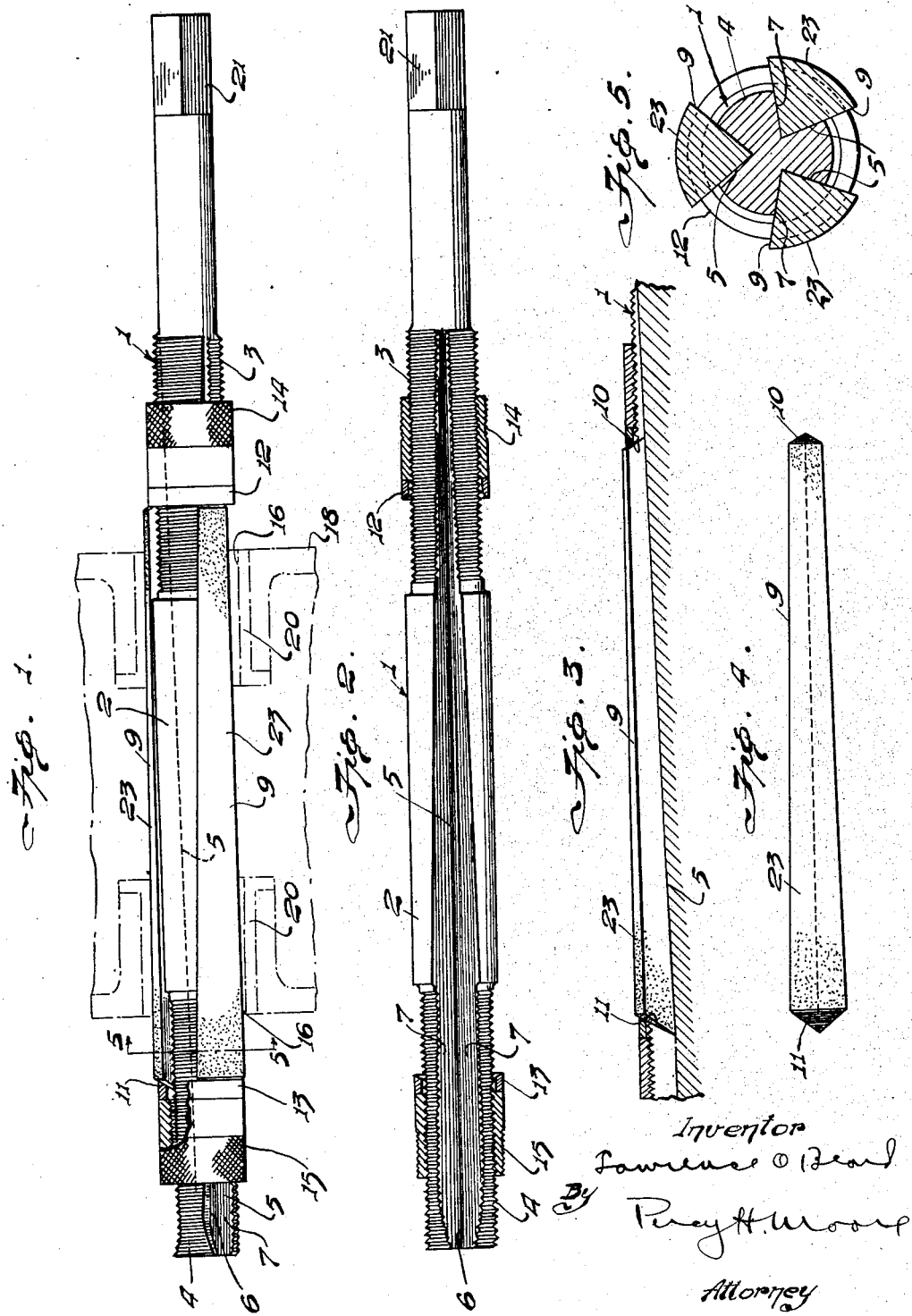
Inventor
Lawrence O. Beard
By Percy H. Moore
Attorney Patented Aug. 30, 1932

1,874,856

UNITED STATES PATENT OFFICE

LAWRENCE O. BEARD, OF LANCASTER, PENNSYLVANIA

ABRADING TOOL

Application filed March 29, 1930. Serial No. 440,131.

My invention relates to abrading tools and more particularly to that class of tools adapted for truing bushings in the piston pin bores of internal combustion engine pistons, although an abrading tool embodying the invention may be used for other work.

The principal object of the invention is to so farm the usual spaced apart abrading members, and their seats in the tool shank, that a maximum of bearing surface will be obtained, thus eliminating chattering.

Another object is to provide a tool in which parallel expansion of the abrading members may be readily effected.

Another object of the invention is to provide abrading members which may be readily mounted in the tool shank, and as easily removed for repair or to permit the substitution of another abrading member.

I accomplish the above-mentioned and other related objects by the improved construction hereinafter described and claimed.

Of the accompanying drawing forming a part of this specification:

Figure 1 is a side elevation of a tool embodying the invention, and shows in outline a piston pin bearing to which the tool is applied;

Figure 2 is a side elevation of the tool shank with the abrading members removed;

Figure 3 is a longitudinal sectional view of the tool showing one of the abrading members mounted therein.

Figure 4 is a top plan view of the abrading member shown in Figure 3; and

Figure 5 is a section on the line 5—5 of Figure 4.

Referring more particularly to the drawing wherein the same reference characters indicate like parts in all the figures, 1 represents the shank of the abrading tool, which is formed with the smooth unthreaded intermediate portion 2 and adjacent threaded portions 3 and 4. The shank 1 is also provided with V-shaped longitudinal slots 5, of graduated depth, the bottoms 6 of the slots being inclined relative to the axis of the shank, and the side walls 7 converging with each other.

Abrading members 9, V-shaped in cross section and of graduated depth and thickness are movably inserted in the said slots, and are provided with beveled end faces 10 and 11 engaged with the beveled ends of collars 12 and 13, in turn held in place by confining nuts 14 and 15, screwed upon the threaded portions 3 and 4, of the shank 1. The members 9 are shaped to fit snugly within the slots 5, but the latter being slightly shallower than the depth of the members 9, the operative faces 23 of these members will project slightly beyond the mouth of the slots.

The abrading members are assembled by sliding them along the slots 5 until the tapered ends 10 engage the collar 12, and then screwing up the nut 15 to cause the collar 13 to engage the tapered ends 11, thus clamping the members 9 tightly in place. Parallel expansion of the abrading members is accomplished by loosening the nut 14 and screwing up the opposing nut, in a manner readily understood.

From the foregoing it will be seen that by virtue of the V-shape construction of the slots and abrading members a two point bearing contact between the respective walls of the slots 5 and the sides of the members 9 is secured, thus eliminating chattering.

The abrading members 9, are preferably made of the well known material from which emery wheels are made, for manufacturing use, where grinding or fast cutting is desired, but where more accurate work is required, these members are made of oil stone. For some purposes such as burnishing or rounding piston pin holes to provide a better bearing surface, the members 9 may be made of hardened and ground and polished steel, but in all instances the shape and proportions will be the same.

In actual manufacturing practice, where used on new work, the ends of the tool shank are removably mounted for rotation in any suitable machine. On repair work, the tool is inserted through the bores 16 of the piston 18, thus bringing the working faces 23 of the members 9 into engagement with the bushings 20, it being understood that the piston will preferably be clamped in a suitable vise, not shown, during the abrading operation. The reamer is then rotated by means of a crank or other suitable tool connected to the shouldered end portion 21. However, it will be understood that the abrading tool may also be machine driven when employed on repair work.

Having thus described my invention, what I claim is:

An abrading tool comprising a shank having elongated slots therein, said slots being of graduated depth and having opposing outwardly diverging side walls, and elongated abrading members of graduated depth fitting snugly within said slots, the said abrading members having substantially unbroken abrading surfaces of relatively great width and inwardly diverging opposing sides adapted to seat against the side walls of the slots.

In testimony whereof I affix my signature.

LAWRENCE O. BEARD.